April 16, 1946.  A. B. RUMSEY  2,398,463
GRINDING MACHINE
Filed July 11, 1942  6 Sheets-Sheet 1

Fig. 1.

Inventor
Amos B. Rumsey
BY
Parker, Carlson, Pitzner & Hubbard
Attorneys.

April 16, 1946.  A. B. RUMSEY  2,398,463
GRINDING MACHINE
Filed July 11, 1942  6 Sheets-Sheet 5

Fig. 5.

Inventor
Amos B. Rumsey
BY
Parker, Carlson, Pitzner & Hubbard
Attorneys.

Patented Apr. 16, 1946

2,398,463

UNITED STATES PATENT OFFICE 2,398,463

GRINDING MACHINE

Amos B. Rumsey, Beloit, Wis., assignor to Gardner Machine Company, South Beloit, Ill., a corporation of Illinois Application July 11, 1942, Serial No. 450,537

10 Claims. (Cl. 51—114)

The invention relates generally to grinding machines and more particularly to a vertical grinder.

The general object of the invention is to provide a novel grinding machine for grinding the end faces of generally cylindrical articles such as coiled springs, bushings, pins, shafts, ball races, etc., which is so constructed as to grind the maximum quantity of such articles that one operator is capable of loading into the machine.

Another object is to provide a novel grinding machine with the grinding surfaces in spaced horizontal planes so that work may be fed horizontally into the grinding area, such horizontal position facilitating loading and unloading of the articles being ground.

It is also an object to provide a novel grinding machine having a plurality of work holders or paddles arranged to be intermittently shifted in a horizontal plane from a loading position to a grinding position and then to an unloading position, the paddles being reciprocated parallel to the grinding surfaces to effect uniformity of stock removal on all articles within the grinding area and to produce even wear on the grinding wheels.

Another object is to provide a grinding machine for grinding work of the above-mentioned character, in which heads carrying the two grinding wheels are fed relatively toward and from each other hydraulically through a set distance, the setting of which is not disturbed when the wheels are separated a relatively large distance for dressing.

Another object is to provide a vertical grinder having two heads each carrying a grinding wheel, with means for adjusting both wheels in a vertical direction manually, and a motor drive coupled to at least one of the manual adjustments to permit quick separation of the wheels when it is desired to dress them.

Still another object is to provide a vertical grinder having two vertically spaced grinding wheels, the general arrangement of the machine being such that the loading of the workpieces and the control of the heads carrying the wheels may be readily handled by a single operator.

A still further object is to provide a modified form of grinder having two vertically spaced grinding wheels so arranged that work may be moved into grinding position from diametrically opposite points with an operator at each loading position so that the production rate is substantially double that of a machine having only one loading position.

Other objects and advantages will become apparent from the following description, taken in connection with the accompanying drawings, in which.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

In grinding the end faces of generally cylindrical articles such as coiled springs, bushings, shafts, ball races, etc., it has heretofore been the usual practice to provide a machine in which the grinding faces of the grinding wheels lie in vertical planes so that the movement of the workpieces into the grinding area is in a vertical plane. In such machines, the work carrier usually comprises a member provided with a plurality of pockets in which the workpieces are loosely inserted. Guides in front of the grinding disks may be provided for generally centering the workpieces within the work holder. However, it takes considerable time to load a work carrier of this character since each workpiece has to be individually inserted.

In a machine embodying the features of the invention, the grinding faces are in spaced horizontal planes so that the work carrier may move in a horizontal plane. With the work carrier so positioned, the workpieces may be loaded into the work carrier much more easily and quickly. Thus a much greater rate of production can be attained in a machine of the character herein disclosed.

A machine embodying the features of the invention comprises generally a base structure in the form of a column on which are mounted two heads carrying the grinding wheel in face-to-face vertically spaced relation. Both heads are adjustable vertically to provide for workpieces of different length and to take up for wear in the thickness of the disks. Both heads are also tiltably adjustable so that the grinding faces of the wheels may be held accurately in parallel relation. Each grinding wheel is driven by its own motor carried by the head supporting the wheel. While each of the heads may be adjusted manually, at least one of the heads is provided with a power drive for the vertical adjustment so that the adjustment in spite of the great weight of the head may be expeditiously made.

At one side of the grinding wheel is a supporting structure for the work carrier. Such supporting structure has mounted thereon a carriage reciprocable in a direction radially of the grinding wheels and operated by a reciprocating means so that the work within the grinding area is constantly moving in the direction of reciprocation to produce even wear on the grinding wheels. To gain a high rate of production, the carriage is provided with a pivot about which a plurality of work carriers are arranged. Preferably three such work carriers are provided extending radially from the pivot so that one work carrier may be in a loading position while the second work carrier extends into the grinding area between the grinding wheels, and the third work carrier extends to a position where the finished workpieces may drop out of their respective pockets. Each work holder has a plurality of pockets therein, and to hold the workpieces in such pockets an underlying stationary plate is provided which extends up to the periphery of the lower grinding wheel. There is also a smaller plate adjacent the exit side of the grinding wheels so that the workpieces will be carried well beyond the wheels before dropping out of the work holder. The work holders are adapted to be intermittently indexed about the pivot therefor, and the workpieces remain in the grinding area until brought down to size before being indexed to the unloading position.

When the workpieces are first moved into the grinding area, the grinding wheels are spaced sufficiently far apart to permit the workpieces to be readily moved into grinding position. Thereupon relative feeding movement between the grinding wheels is effected by moving the upper wheel downwardly. Such movement is under the control of a hydraulic actuator and the upper and lower limits of the movement are controlled by a predetermined setting. The amount of movement determined by such setting is unaffected by the vertical adjustment of either of the heads. Thus the wheels may wear due to the grinding operation and may be dressed, with an adjustment being made for such wear or dressing, without disturbing the setting of the vertical feeding movement of the upper wheel. Such feeding movement is completed before the work is indexed, and during the entire period of the feeding movement the work holder is reciprocated.

Carried on the column of the machine is a dressing mechanism arranged for vertical adjustment so that it may dress the faces of either the upper or lower wheel. Hydraulic means is also provided for reciprocating the dresser radially of the wheel. The upper head is adjusted upwardly when the wheels are being dressed so that the power drive for the upper head adjustment provides for quick operation and consequent reduction of lost time in operating the machine on a production basis.

The wheels are provided with peripherally arranged guards, and a suction device is mounted on the column adjacent the periphery of the wheels so that the dust and grit loosened in the grinding operation is readily disposed of.

As shown in the drawings, the preferred embodiment of the machine comprises a flat base 10 at one side of which is mounted a hollow column 11. The column 11 is generally rectangular in cross section and carries on one vertical face a lower head, indicated generally at 12, and an upper head, indicated generally at 13, the two heads being vertically alined. The lower head carries a lower grinding disk 14 and the upper head carries an upper grinding disk 15. Each head comprises a slide 16 carried in vertical ways provided on the face of the column 11. The lower slide 16 has mounted on its front face for pivotal adjustment a housing 20 provided with vertically spaced bearings in which a spindle 21 is supported. The spindle 21 is provided at its upper end with means by which the grinding disk 14 is secured to the spindle in driving relation therewith.

The lower slide 16 also carries a bracket 22 extending inwardly into the interior of the column 11. The bracket 22 supports a motor 23 connected by V-belts 24 to a pulley 25 on the lower end of the spindle 21. To provide for tightening of the belts 24, the motor 23 is carried on a platform 26 pivotally supported by the bracket 22 in the usual manner. Thus the lower grinding wheel 14 is driven by its own motor 23.

The bracket 22 also has rigidly secured thereto a nut 30 threaded to receive a vertically extending screw 31. The screw 31 extends upwardly and is journaled in a gear casing 32 mounted within the column 11 at a point approximately midway of its height. Within the gear casing 32 a worm wheel 33 is secured to the upper end of the screw 31 and meshes with a worm 34 carried on a horizontal shaft 35. The shaft 35 extends through one wall of the column 11 and has at its front end a squared portion 36 to receive a crank by which it may be turned. Thus when the shaft 35 is turned the screw 31 raises or lowers the lower slide 16 to adjust the lower grinding wheel 14 vertically.

Figure 4:
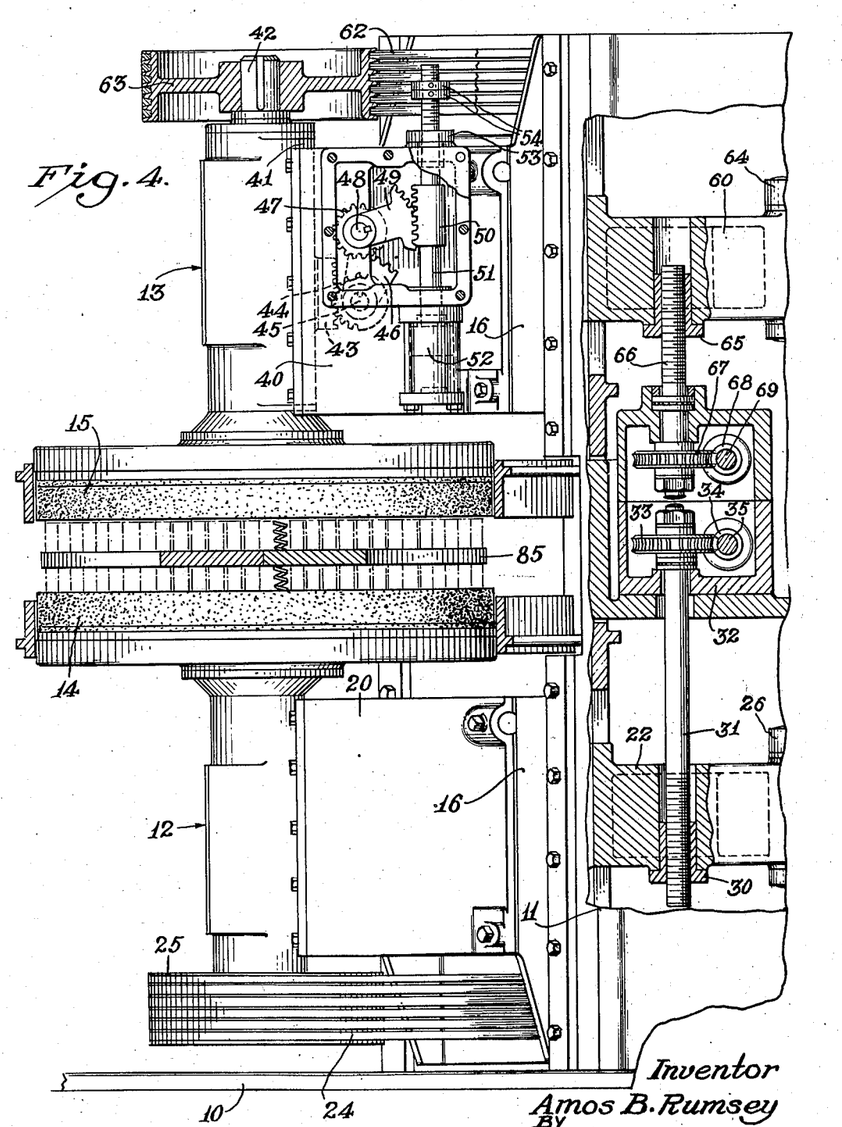
Fig. 4 is a fragmentary vertical sectional view taken on the line 4—4 of Fig. 2 showing the structure of the grinding heads.
Figure 5:
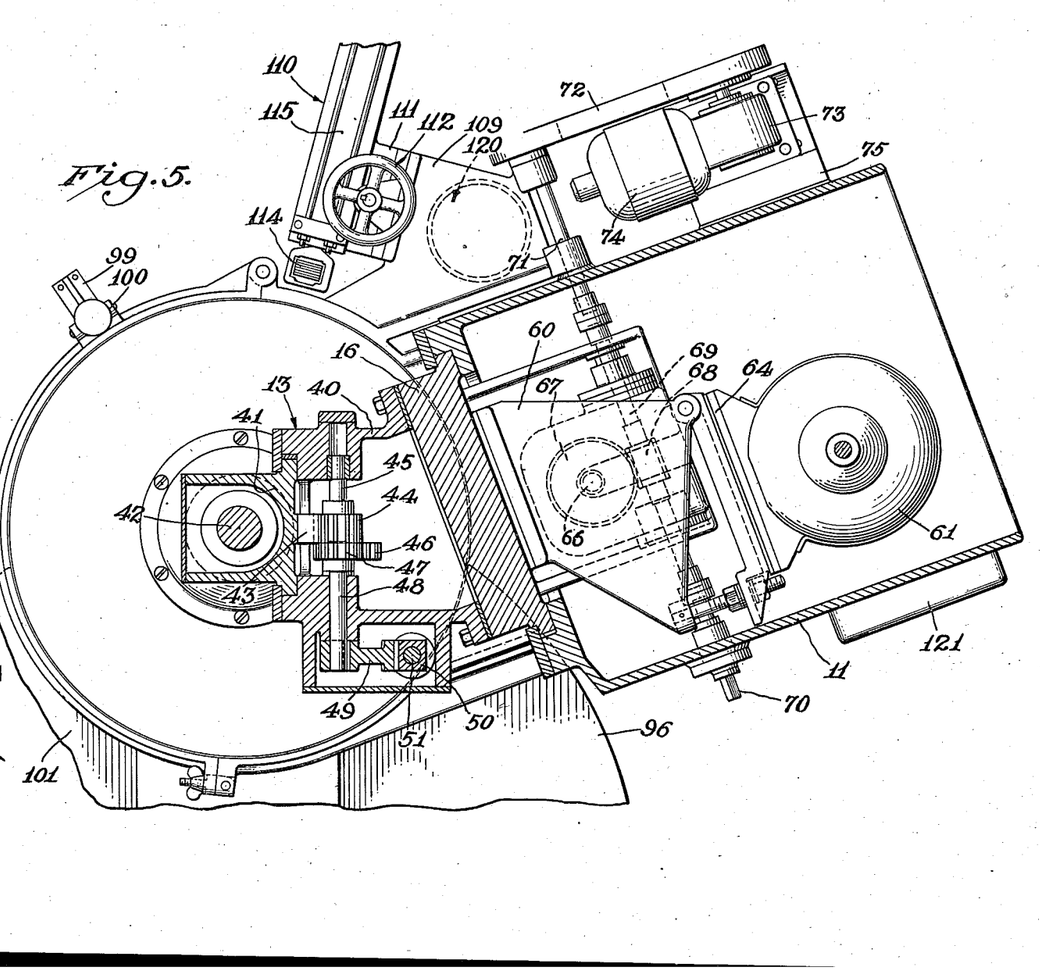
Fig. 5 is a fragmentary horizontal sectional view of the upper head taken substantially on the line 5—5 of Fig. 1.

The upper head 13 is constructed in a manner generally similar to the lower head. However, the relative feeding movement between the two grinding disks is effected by moving the upper grinding disk downwardly during the course of grinding the workpieces carried by one work holder. To this end, the slide 16 of the upper head carries a housing 40 on its front face, which has a slight pivotal adjustment relative to the slide 16 so that the two grinding wheels may be adjusted in parallelism. On the front face of the housing 40 is a second slide 41 supporting the spindle 42 for the upper grinding wheel 15. The second slide 41 carries a rack 43 on its inner face (see Figs. 4 and 5) which meshes with a pinion 44 carried on a transversely extending stub shaft 45. At one side of the pinion 44 a gear sector 46 is mounted on the stub shaft 45 and meshes with a pinion 47 carried on a second stub shaft 48. The two stub shafts 45 and 48 are journaled in the side walls of the housing 40, and the stub shaft 48 carries on its end a second gear sector 49 meshing with a rack 50. The rack 50 is carried by a vertically slidable shaft 51 which constitutes the piston rod of a hydraulic cylinder actuator 52.

The hydraulic actuator 52 is rigidly secured to the housing 40 on the side wall thereof and is adapted to move the shaft or piston rod 51 vertically to effect vertical movement of the upper grinding wheel 15. The gearing comprising the various gear sectors, racks and pinions heretofore referred to is arranged to provide a ratio between the movement of the shaft 51 and the grinding wheel 15 of five-to-one; that is, for each unit of movement of the grinding wheel 15 the piston rod 51 moves five times as far. By using a hydraulic feeding means, the grinding pressure remains substantially constant during the feeding movement, and consequently the movement will be adjusted automatically to conform to the rate at which the wheels remove stock from the work.

Since the movement of the upper grinding wheel 15 by the hydraulic actuator 52 is provided to determine the amount ground off of each workpiece, means is provided for predetermining the amount of movement permitted by the hydraulic actuator. To this end, the housing 40 has on its upper end a hardened bushing 53 through which the piston rod 51 extends. The upper end of the piston rod 51 is provided with a pair of adjustable lock nuts 54 which are adapted to contact the bushing 53 and thereby limit the downward movement of the piston rod 51 and consequently the downward movement of the upper grinding wheel 15. The adjustable lock nut 54 may be set at such distance from the bushing 53 as to provide the proper amount of feed for any given workpiece. Thus the nuts 54 may be set for a predetermined amount of feed and their setting need not be disturbed when separating the grinding wheels for dressing, and readjusting them to the proper spacing.

The upper slide 16 is provided with a bracket portion 60 (see Figs. 4 and 5) extending into the column 11 for supporting a motor 61. The motor 61 is connected by V-belts 62 to a pulley 63 on the upper end of the upper spindle 42. In order to provide for take-up for the belt, the motor 61 is mounted on a platform 64 pivoted to the bracket 60.

To adjust the upper head vertically, the bracket has rigidly secured thereto a nut 65 receiving a screw 66 extending downwardly therefrom. The screw 66 extends into the interior of gear housing 32 and therein has secured to it a worm wheel 67. The worm wheel 67 is adapted to be operated by a worm 68 carried on a transversely extending shaft 69. The shaft 69 is journaled in opposite walls of the column 11 and at its front end has a squared portion 70 to receive a hand crank by which the upper head may be adjusted vertically.

Figure 2:
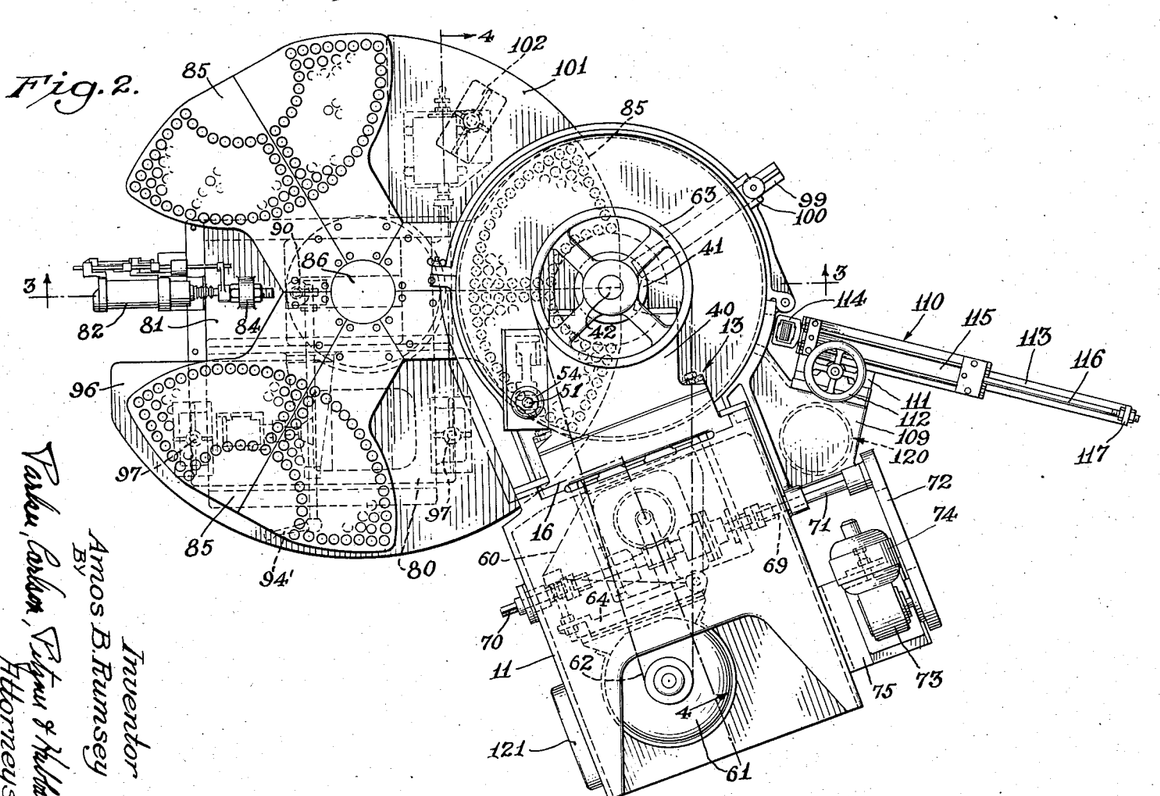
Fig. 2 is a plan view of the machine shown in Fig. 1.

Because of the weight of the upper head and its various parts, including the upper grinding wheel, it would be a rather slow job to adjust the upper head by hand each time the grinding wheels are dressed. Therefore power drive means are provided for effecting vertical adjustment of the upper head. To this end the shaft 69 extends rearwardly of the column 11, as at 71 (see Fig. 2), and on its rear end carries a pulley receiving a belt 72. The belt 72 is driven by a gear reduction unit 73 and a motor 74 carried on a platform 75 on the rear outer face of the column 11. Thus by means of such power drive, the upper head may be adjusted upwardly in a quick manner to permit the dressing mechanism to enter the space between the wheels, and may be readjusted into grinding position without unnecessarily delaying production time for the machine and without requiring any large manual exertion to effect the adjustment.

The work support of the present machine is so constructed as to provide for ready loading of the workpieces therein, as well as to facilitate unloading. Also, the work support is arranged so that the workpieces are reciprocated linearly during their grinding so that the grinding wheels will wear evenly and consequent accuracy of grinding is attained. To this end, the base 10 carries a supporting structure 80 on the upper face of which are slides to receive a reciprocable carriage 81. The slides and carriage 81 are positioned so that the carriage 81 moves in a line extending radially of the grinding wheels. The supporting structure 80 also carries a hydraulic actuator 82 for reciprocating the carriage, the cylinder of the hydraulic actuator being carried by a bracket 83 extending from the supporting structure, and the piston rod of the actuator being connected to a lug 84 on the slide 81.

The work in the present instance is illustrated as coiled springs, the ends of which are ground flat in this machine. Such workpieces are carried in work holders in the form of paddles 85. Each paddle 85 is provided with a plurality of holes or pockets to receive the workpieces, such pockets being arranged in the paddles in such a way as to conform to the grinding area of the wheels when the paddles are moved therebetween. The paddles 85 are preferably three in number and are arranged radially relative to each other and to a central pivotal support 86 carried by the carriage 81. Thus the paddles may be intermittently indexed from a loading position into the grinding area and then to an unloading position. As shown in the drawings, the paddles are arranged to be indexed counterclockwise as viewed in Fig. 2. The paddles 85 are adapted to be removably attached to the central pivotal support 86 so that paddles dimensioned to receive other sizes and kinds of workpieces may be mounted thereon.

Figure 1:
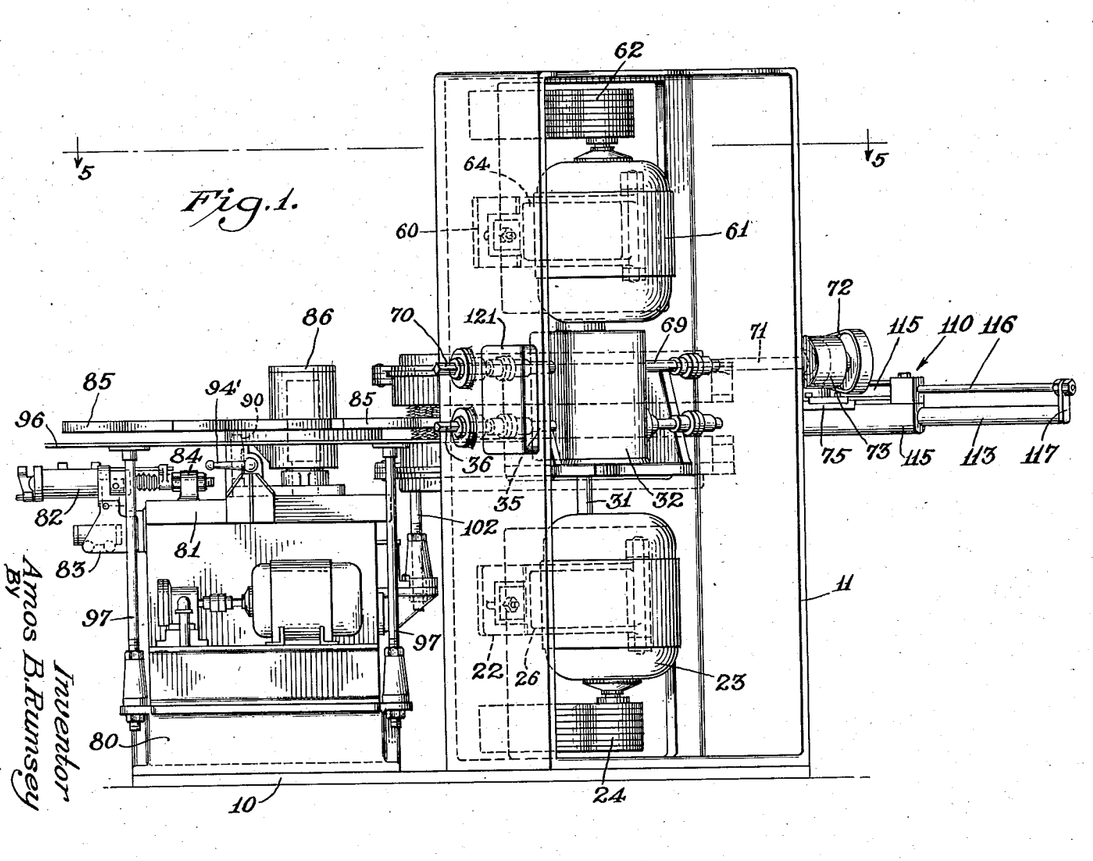
Figure 1 is a front elevational view of a machine embodying the features of the invention.
Figure 3:
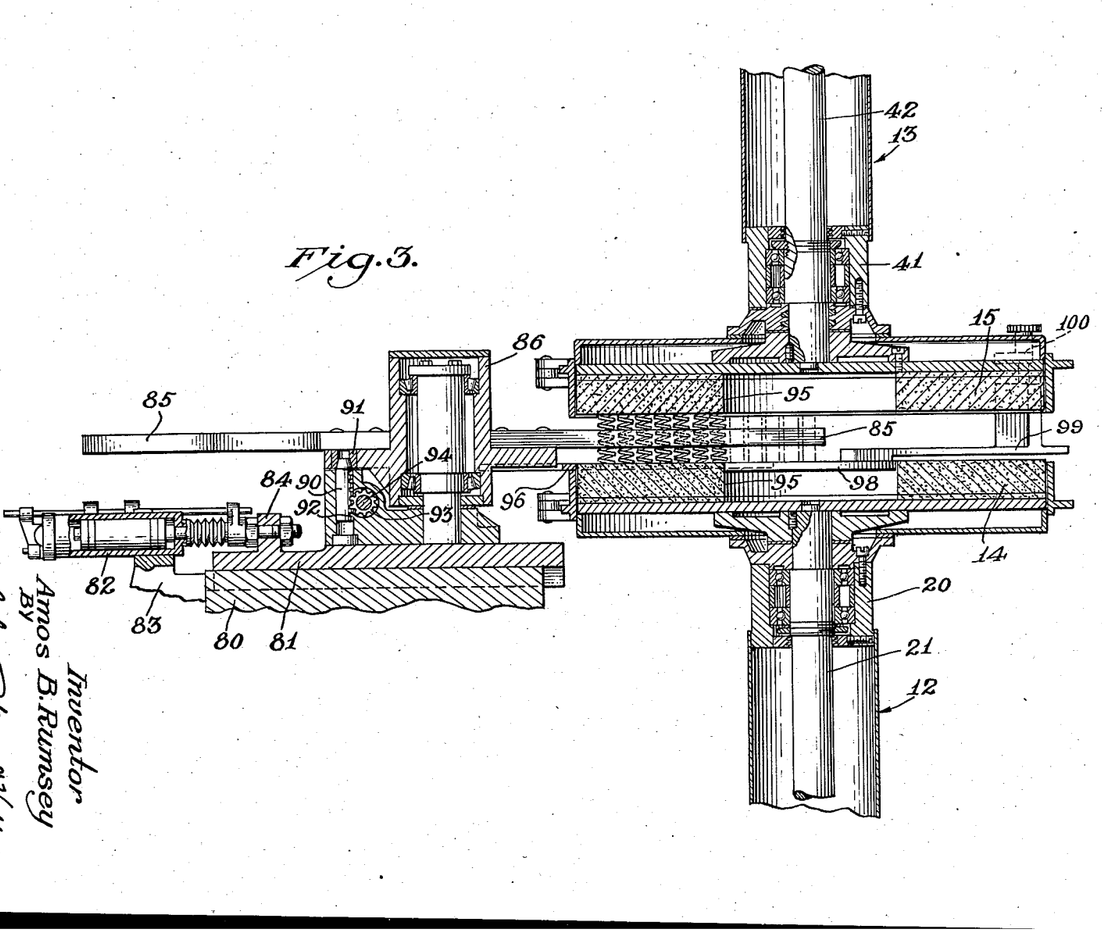
Fig. 3 is a fragmentary sectional view taken on the line 3—3 of Fig. 2.

Since the workpieces in each of the paddles 85 remain in the grinding area until brought down to size, locking means is provided for holding the work paddles in their various indexed positions. As shown herein, said locking means comprises a pin 90 (see Figs. 1 and 3) mounted for vertical sliding movement in the carriage 81 and adapted to enter bushings 91 in the pivotal support 86. To move the pin 90 into locking and unlocking positions, the pin 90 is provided on one side with a rack 92 meshing with a pinion 93 carried on a stub shaft 94. The stub shaft on its outer end carries a hand lever 94' by which it may be manually actuated. Thus the locking pin 90 holds the work supporting paddles 85 in their various indexed positions and may be released to permit indexing movement thereof.

As mentioned above, the work supporting paddles 85 extend in a horizontal plane, and the workpieces during the grinding operation bear against the grinding faces of the two disks 14 and 15. Each grinding disk is of the type having a central aperture 95 (see Fig. 3), and the pockets in the paddles to receive the workpieces are arranged to overlie substantially one-half the grinding faces of the disks. The reciprocation of the paddles effected by the hydraulic actuator 82 is of such length preferably as to cause the workpieces adjacent the outer periphery of the grinding wheels to partially break over the outer periphery when at one limit of movement produced by the actuator, and to cause the workpieces adjacent the apertures 95 in the grinding wheels to partially break over the inner periphery of the wheels when at the other limit of the stroke of the reciprocating means. Thus the entire facial area of the grinding wheels contacts the workpieces so that the wear on the grinding wheels is uniform. Such uniformity of wear results in producing uniform grinding of the respective workpieces.

The horizontal position of the paddles 85 facilitates loading of the workpieces into the pockets of the paddles since an operator can more readily and quickly drop the workpieces into the pockets in the paddles 85 with the paddles in the horizontal position than he could if the paddles were in a vertical plane. However, an underlying surface has to be provided to hold the workpieces in the paddles when in the loading position. To this end a plate 96 (see Figs. 1 and 2) is provided under the paddles at the loading position. The plate 96 extends to the periphery of the lower grinding wheel at the level of the grinding face thereof so that the workpieces may ride on the face of the plate 96, during the indexing movement, directly into the grinding area of the wheels. The plate 96 is preferably supported by uprights 97 extending upwardly from the supporting structure 80. The uprights 97 are of adjustable construction so that the plate 96 may be shifted to conform to the adjusted position of the lower grinding wheel 14.

Because of the central aperture 95 in the lower grinding wheel 14, and the shape of the paddles 85, it is necessary to move some of the workpieces across the aperture 95 during the indexing movement to bring the workpieces into the desired position in the grinding area. To support such workpieces in their movement across the aperture 95, a fixed plate 98 (see Figs. 2 and 3) is located within the aperture 95 at the level of the upper surface of the lower grinding wheel 14. The plate 98 is preferably supported by an arm 99 extending inwardly over the upper surface of the lower grinding wheel 14. The arm is carried by an adjustable bracket 100 outside the periphery of the lower grinding wheel.

After the workpieces have been ground, the indexing movement of the work support shifts to an unloading position where they merely drop out of the paddles 85. It is preferable that such unloading position be located at some distance from the grinding wheels so that a container may be placed under the paddles at such position to catch the workpieces when they fall. For this reason, a plate 101 (see Fig. 2) is positioned at that portion of the periphery of the lower grinding wheel where the workpieces move out from the grinding area. The plate 101 supports the workpieces in the paddles until they move over to a suitable position for letting the workpieces fall into a container. The plate 101 is adjustably supported by an upright 102 in a manner similar to the plate 96.

As mentioned above, provision is made for dressing the wheels when necessary. To this end a dressing mechanism, indicated generally at 110 (see Figs. 1, 2, and 5) is provided. The dressing mechanism 110 comprises a slide 111 supported on the rear side of the column by a housing 109 and provided with means for adjusting the slide vertically, including a handwheel 112. By such vertical adjustment of the dressing mechanism the faces of both the grinding wheels 14 and 15 may be readily dressed. The slide 111 carries an arm 113 reciprocable radially of the grinding wheels and having a dressing device 114 on its inner end. To reciprocate the arm 113, a hydraulic actuator is mounted on the slide 111, the actuator comprising a cylinder 115 (see Fig. 1), and a piston rod 116 rigidly secured at its outer end to the outer end of the arm 113 by a bracket 117.

In order to prevent grit and dirt produced as a result of the grinding operation from accumulating on the machine, a suction device may be provided. Preferably such suction device, indicated generally at 120 (see Figs. 2 and 5), is mounted in the housing 109 which supports the dressing mechanism 110.

The electrical and hydraulic controls for the various parts of the machine are preferably located at a central point adjacent to the point where the operator stands when loading the machine. Therefore a control panel 121 (see Figs. 2 and 5) may be mounted on the column 11 adjacent the position for loading the workpieces into the paddles 85. Thus the operator may stand at such position and load the workpieces into the paddles and readily control the various movements of the machine.

In operating the machine, the operator stands adjacent the paddle which is in the loading position and overlying the plate 96. He is thus able to speedily place workpieces in the pockets of the paddle preparatory to the movement of the paddle into the grinding area. Also, the control panel 121 for the machine is conveniently positioned so that the operator may control all movements of the machine without moving from the loading position.

The workpieces during the indexing movement are held in the pockets in the paddle by the plate 96 and are carried into the grinding area of the machine by the indexing movement, the plate 98 preventing any workpieces from falling into the central aperture 95 of the lower grinding wheel. While the workpieces are held in the grinding area, the operator causes the hydraulic actuator 82 to reciprocate the slide 81 so that while the grinding wheels are rotating over the end faces of the workpieces, such workpieces are also being linearly reciprocated parallel to the grinding faces so that all parts of the grinding faces will be evenly worn during the grinding operation. When the paddles are indexed they are locked to the carriage 81 by means of the pin 90. After the workpieces have been ground, the indexing movement of the paddles slides the workpieces over the plate 101 and when they pass the left-hand edge thereof, as viewed in Fig. 2, they will drop out of the pockets in the work paddle and a suitable container may be placed thereunder to receive them. Thus the horizontal position of the paddles not only provides for easy loading thereof, but also makes it unnecessary for any hand operation to be performed in unloading them.

During the grinding operation, the upper head is fed downwardly by the hydraulic actuator 52 through a predetermined distance as controlled by the abutment 53 and the lock nuts 54. When the upper grinding disk has been lowered through this distance, and a suitable dwell period permitted at the end of such movement, the workpieces will have been ground to the desired length with the end faces parallel to each other.

As the disks wear, they may be redressed to provide definitely flat grinding faces and to provide better cutting by the abrasive. When dressing the wheels, the upper head is raised, the motor 74 being utilized for this purpose so that the heads may be quickly separated. The dressing mechanism is then adjusted vertically by means of the handwheel 112 first to dress the facing of one disk, and then to dress the facing of the other disk, the dresser 114 being hydraulically reciprocated radially of the disks. After dressing the disks, the upper head is lowered to provide the proper distance between the disk. However, such raising and lowering of the upper disk during the dressing operation does not disturb the setting of the length of feed of the upper head determined by the nuts 54 in the abutment 53. The lower head may also be adjusted if desired by placing a hand crank on the squared end 36 of the shaft 35.

The machine shown in Figs. 1 to 5 may be operated by one operator. The size of the paddles and the number of workpieces therein are preferably arranged so that the grinding operation may be completed in slightly less time than it requires the operator to load one of the paddles. Thus the maximum production will be obtained.

Figure 6:
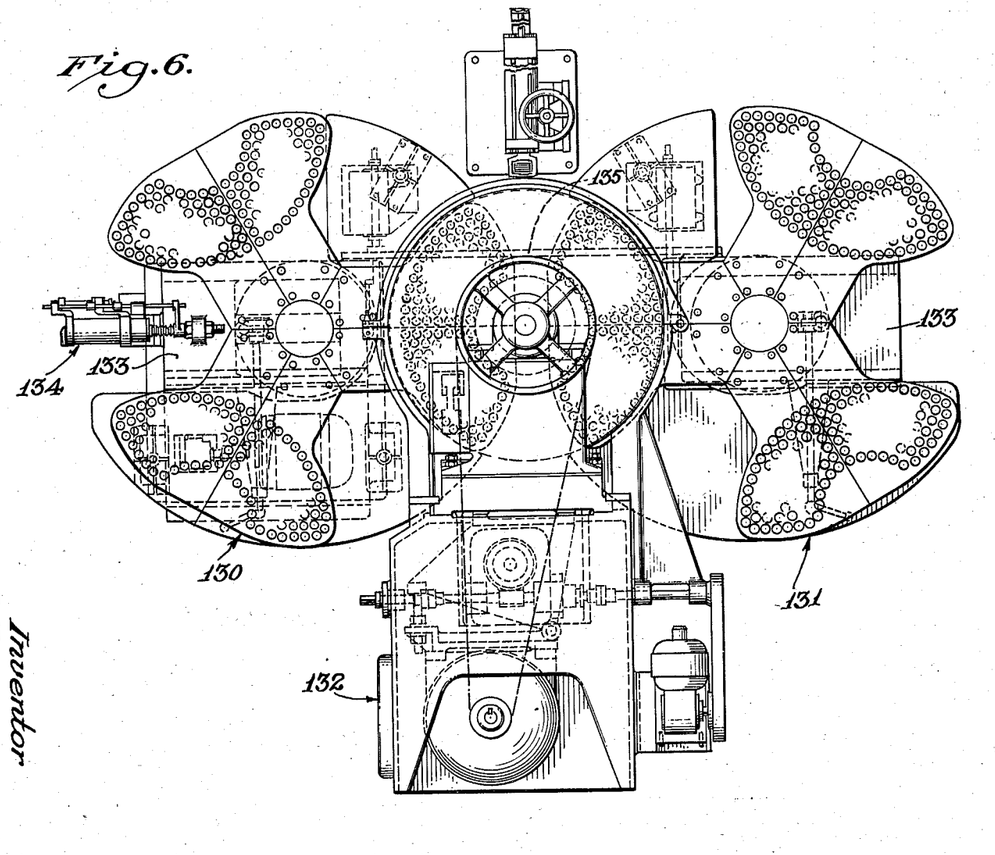
Fig. 6 is a plan view of a modified form of machine.

The machine shown in Fig. 6 is arranged for two operators, and two work supports are provided, as indicated at 130 and 131. The work support 130 is arranged to be indexed counterclockwise while the work support 131 is arranged for clockwise indexing. The two work supports as illustrated are diametrically opposite each other relative to the grinding wheels and the column supporting the grinding heads is located at one side of and between the two work supports with the dressing mechanism located diametrically opposite the column. The control panel, indicated at 132, for the machine is located on one side of the column adjacent the position where one of the operators stands in loading the work fixture 130.

Since the work supporting paddles when in the grinding area overlie approximately one-half the grinding area, the two sets of paddles of the respective work supports do not interfere with each other, each one utilizing one-half of the single pair of grinding disks. The two work supports are similarly constructed to that shown in Figs. 1 to 5, and each comprises a carriage 133 reciprocable in the same line. To effect such reciprocation, only one hydraulic actuator, indicated at 134, need be provided. The two carriages 133 are connected by a bar 135 so that both carriages will be reciprocated by the hydraulic actuator 134.

Thus in the machine shown in Fig. 6, approximately twice the rate of production may be attained as in the machine shown in Figs. 1 to 5 since workpieces carried by the respective work holders are simultaneously being ground. Each operator loads his work holder independently of the other operator and the grinding time is slightly less than that required for loading. While ordinarily the same size of workpiece is handled by both work holders, it is of course possible to grind one diameter of workpiece in one work holder and grind a workpiece of different diameter in the other work holder, provided the two workpieces are of the same length.

From the foregoing description, it will be apparent that I have provided a novel grinding machine for grinding the end faces of generally cylindrical articles which will attain a maximum production rate. The machine is so arranged that the rate of production is dependent solely upon the rate at which the operator can load workpieces into the work holder. Because of the fact that the work holder is in a horizontal plane, loading of the workpieces therein is greatly facilitated since it is much easier to drop a workpiece into a pocket than it is to insert it in a work holder moving in a vertical plane. The relative feeding movement of the heads may be determined and set for a given size workpiece and thereafter such setting is not disturbed by adjusting the heads for wear or separating them to dress the wheel. The work when in the grinding area is reciprocated in such a manner that it produces a relatively even wear on the grinding wheels, thus attaining a uniformity in the finished workpieces. After the workpieces have been ground, they are merely moved by an indexing movement to a position where they drop out of the work holder by gravity.

I claim as my invention:

1. A grinding machine of the character described comprising, in combination, a pair of grinding wheels having their grinding faces in parallel vertically spaced relation, a pair of heads supporting said wheels and arranged for relative vertical movement toward and from each other, and a work carrier mounted at one side of the grinding wheels and comprising a plurality of work holders extending radially from a common axis parallel to the grinding wheel axis, means for supporting said work holders for rotation about said common axis whereby said work holders may be moved in a horizontal plane from a loading position at one side of said wheels to a grinding position in the space between said wheels and then to an unloading position outside of said wheels, and means for effecting straight-line reciprocation of said work holders in a horizontal plane during the grinding operation.

2. A grinding machine of the character described comprising, in combination, a pair of coaxially spaced grinding wheels, means for relatively feeding said wheels toward each other, and a work carrier comprising a plurality of work holders radially arranged about an axis parallel to the grinding wheel axis, means for supporting said work holders for indexing movement about said first mentioned axis into the space between the wheels, and means for reciprocating said work holders during the grinding operation in a straight horizontal line having the direction of a line joining the work holder axis and the grinding wheel axis.

3. A grinding machine of the character described comprising, in combination, a pair of vertically spaced horizontally positioned grinding wheels each having a central aperture, means for effecting a relative feeding movement of said wheels toward each other, and a work carrier comprising a plurality of work holders radially arranged about a common axis parallel to the grinding wheel axis, each of said work holders being adapted to receive a plurality of workpieces, means for supporting said work holders for indexing movement about their common axis into the space between the wheels, and means for effecting straight-line reciprocation of said work holders in a horizontal plane during the grinding operation, said reciprocation being of sufficient extent to carry the workpieces adjacent the periphery of the grinding wheels beyond such periphery when the work holder is moved in one direction and to carry the workpieces adjacent the central aperture of the wheels inwardly into said aperture when moved in the other direction to effect even wear on the wheels.

4. A grinding machine of the character described comprising, in combination, a pair of vertically spaced horizontally positioned grinding wheels, means for effecting relative feeding movement of said wheels toward each other, and a work carrier comprising a plurality of work holders radially arranged about a vertical axis, means for supporting said work holders for indexing movement about said axis to move the work holders successively into the space between the wheels, means for locking said work holders in their indexed position, and means for reciprocating said supporting means in a horizontal straight line whereby the workpieces are reciprocated relative to the grinding surfaces of the wheels.

5. A grinding machine of the character described comprising, in combination, a pair of vertically spaced horizontally positioned grinding wheels, means for effecting relative feeding movement of said wheels toward each other, and a work carrier at one side of said wheel comprising a base structure, a carriage slidably mounted on said base structure for horizontal straight line movement, said carriage supporting a vertically extending pivot, a plurality of work holders extending radially from said pivot whereby said work holders may be indexed into position between the wheels, a locking pin carried by said carriage for locking the work holders against rotation, and hydraulic means for reciprocating said carriage.

6. A grinding machine of the character described comprising, in combination, a pair of vertically spaced horizontally positioned grinding wheels, means for effecting relative feeding movement of said wheels toward each other, and a work carrier comprising a reciprocable carriage located at one side of the grinding wheels, a hub member mounted on said carriage and adapted to be indexed about an axis parallel to the grinding wheel axis, and a plurality of work holders each comprising a centrally extending portion adapted to be detachably attached to said hub member, and an outer work carrying portion shaped to conform substantially to one-half the area of the grinding wheels.

7. A grinding machine of the character described comprising, in combination, a pair of horizontally positioned vertically spaced grinding wheels, a column at one side of said grinding wheels, heads mounted on said column for supporting said grinding wheels, and a pair of work carriers mounted at the respective sides of said column and diametrically opposite each other for moving workpieces into the space between the grinding wheels, each of said work carriers including reciprocable work holders, power-driven reciprocating means connected to the work holders of one of said work carriers, and a connection between the work holders of both work carriers whereby the work holders of both work carriers will be simultaneously reciprocated.

8. A grinding machine of the character described comprising, in combination, a pair of horizontally positioned vertically spaced grinding wheels, a column at one side of said grinding wheels, heads mounted on said column for supporting said grinding wheels and a pair of work carriers mounted at the respective sides of said column and diametrically opposite each other for moving workpieces into the space between the grinding wheels, each work carrier comprising a reciprocable carriage and work holders mounted on said carriage, a hydraulic actuator connected to one of said carriages for effecting reciprocation thereof, and a rigid bar connecting the carriages of the two work holders whereby the workpieces carried by both work carriers will be simultaneously reciprocated during the grinding operation.

9. A grinding machine of the character described comprising, in combination, a pair of coaxially spaced grinding wheels, a work carrier comprising a plurality of work holders radially arranged about an axis parallel to and spaced from the axis of the grinding wheels and indexible into the space between the grinding wheels, means for reciprocating said work holders in a line extending radially of the grinding wheels, and means for relatively feeding said wheels toward each other during the reciprocation of said work holders at a constant grinding pressure.

10. A grinding machine of the character described comprising, in combination, a pair of vertically spaced horizontally arranged grinding wheels, means for relatively feeding said wheels toward each other, and a work carrier comprising three work holders radially arranged about an axis parallel to the grinding wheel axis, means for supporting said work holders for indexing movement about said axis successively from a loading position into the space between the wheels and then to an unloading position, and means for effecting reciprocation of said work holders during the grinding operation, said reciprocation effecting uniform grinding of the workpieces between the grinding wheels and also facilitating unloading of the workpieces at the unloading position.

AMOS B. RUMSEY.